United States Patent [19]

Goebel

[11] Patent Number: 4,554,833

[45] Date of Patent: Nov. 26, 1985

[54] METHOD AND APPARATUS FOR DETERMINING THE UNBALANCE OF WHEELS MOUNTED ON THE DRIVE AXLE OF AN AUTOMOBILE

[75] Inventor: Eickhart Goebel, Pfungstadt, Fed. Rep. of Germany

[73] Assignee: Gebr. Hofmann GmbH & Co. KG Maschinenfabrik, Pfungstadt, Fed. Rep. of Germany

[21] Appl. No.: 532,213

[22] Filed: Sep. 14, 1983

[30] Foreign Application Priority Data

Sep. 14, 1982 [DE] Fed. Rep. of Germany ....... 3234043

[51] Int. Cl.[4] ............................................. G01M 1/28
[52] U.S. Cl. ..................................................... 73/457
[58] Field of Search .................................. 73/457, 458

[56] References Cited

U.S. PATENT DOCUMENTS

| | | | |
|---|---|---|---|
| 2,798,379 | 7/1957 | Merrill et al. | 73/457 |
| 3,483,756 | 12/1969 | Merrill | 73/457 |
| 3,625,081 | 12/1971 | Merrill | 73/457 |
| 3,731,540 | 5/1973 | Emanuel et al. | 73/457 |

OTHER PUBLICATIONS

"Balancing Wheels on the Vehicle", Autohaus magazine published May 14, 1982, pp. 912 through 920.

Primary Examiner—Stewart J. Levy
Assistant Examiner—John E. Chapman, Jr.
Attorney, Agent, or Firm—Fleit, Jacobson, Cohn & Price

[57] ABSTRACT

A method and apparatus is described for determining the unbalance of wheels mounted on the drive axle of an automobile by transducers detecting the forces and/or vibrations produced by the unbalance present in an automobile wheel which is jacked up for this purpose. Other equipment, in addition to the engine of the automobile, drives or brakes either of the two wheels in order to obtain a speed difference between the wheels. A measuring unit determines the magnitude and direction of unbalance. A device also determines the speeds of the driven wheels.

14 Claims, 1 Drawing Figure

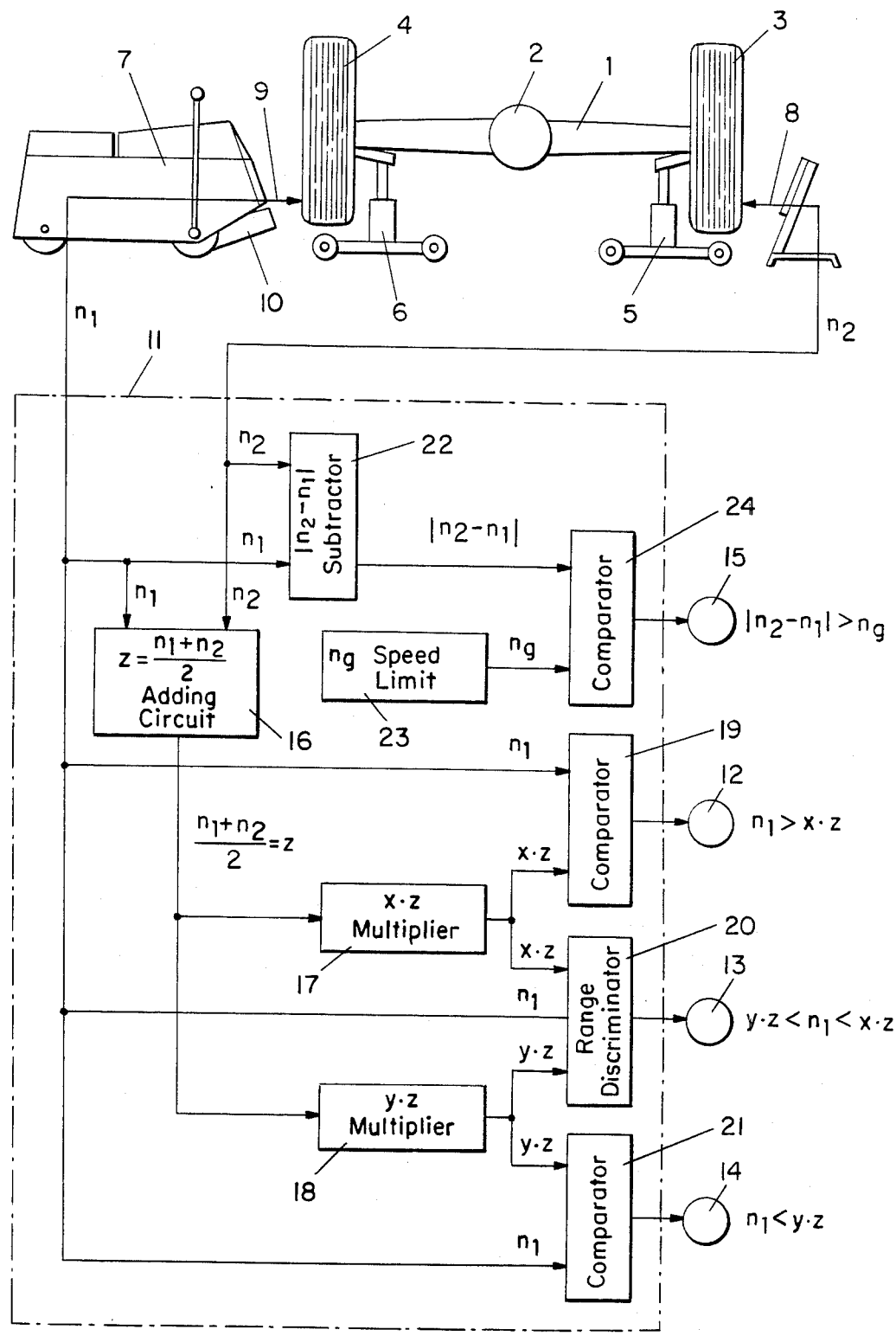

METHOD AND APPARATUS FOR DETERMINING THE UNBALANCE OF WHEELS MOUNTED ON THE DRIVE AXLE OF AN AUTOMOBILE

BACKGROUND OF THE INVENTION

The present invention relates to a determination of the unbalance of wheels mounted on the drive axle of an automobile. The wheels are connected to each other through a differential gear.

DESCRIPTION OF THE PRIOR ART

The treatise "Balancing wheels on the vehicle" published on May 14, 1982 in the "Autohaus" magazine deals with techniques of balancing wheels mounted on the drive axle of an automobile, with the second drive wheel being accommodated on an additional pick-up support, and with additional speed measuring means being provided. As a result, both wheels driven by the vehicle engine can be measured together in one measuring run.

In particular the unbalance moments in the individual wheels to be balanced, which becomes evident as a wobble at the king pins, causes alternate influence of the driven wheels on each other, which influence cannot be filtered out by selective measuring techniques.

SUMMARY OF THE INVENTION

Therefore, it is the object of the present invention to provide for a method and apparatus for determining the unbalance in wheels mounted on an automobile, with the influence of axle-mounted wheels on each other being avoided during the unbalance measurement when both wheels are driven together.

The influence of axle-mounted wheels on each other is avoided by jacking up the two wheels and rotating them by accelerating the automobile engine. By additionally driving one of the raised engine-driven wheels to a higher or lower speed, a speed difference is obtained between both wheels, which guarantees optimum balancing due to a selective measuring technique, with the reading of the speed ratio, or difference being indicated as soon as the speeds required for balancing have been reached.

In the preferred embodiment the measured speed values are fed into an analyser circuit which compares them with preset speed limits and drives a series of meters accordingly. Hence it is indicated whether the speed of the first wheel is sufficiently superior to the one of the second wheel to allow measurement without alternate influences, if both wheels run at fairly identical speeds, or whether the speed of the second wheel is sufficiently superior to the speed of the first wheel so that measurement is feasible.

Furthermore, it is possible to provide for an additional indicator signalling if the speed difference exceeds a preset value, thus avoiding damage, in particular to the differential gear.

BRIEF DESCRIPTION OF THE DRAWINGS

The preferred embodiment is illustrated in the accompanying drawing, in which the top portion of FIG. 1 is a schematic diagram of the automobile axle 1, with the differential gear 2, and the wheels 3 and 4 and the lower portion of FIG. 1 is a circuit diagram of an electronic analyser circuit.

DESCRIPTION OF THE PREFERRED EMBODIMENT

The two wheels 3 and 4, which are mounted at the extremities of the drive axle 1, are jacked up for balancing and to protect the differential gear 2. The wheels are preferably accommodated on two force-measuring pick-up supports 5 and 6 which are applied near to the wheel bearings. An example of how the wheels and drive axle are accommodated on the pick-up supports, along with examples of the force-measuring pick-up supports 5 and 6 are shown in U.S. Pat. No. 3,762,225 (Muller), incorporated by reference herein. The force-measuring means similar to the force measuring cell 28 in the patent to Muller, (not shown in the diagram) are connected with the electronic analyser circuit 11 which is installed in the mobile trolley 7.

Speed transducers 8 and 9 detect marks (not shown) provided on the wheels 3 and 4. The transducers may be of any well known type of optical, mechanical or electronic transducer customarily used for this purpose. The trolley 7 is equipped with known drive means 10 in the form of a friction wheel.

For the balancing process, the wheels 3 and 4 are driven by the automobile engine to a predetermined speed n. Then wheel 4 is accelerated to a superior speed, e.g. 1.2 n, by means of the friction wheel 10. Owing to compensation by the differential gear 2, the speed of wheel 3 will diminish in the same ratio.

The speed transducers 8 and 9 determine the speeds of the two wheels 3 and 4 and feed the data obtained into the analyser circuit 11 which is preferably incorporated in the trolley 7. This circuit 11 compares the measured speeds with preset speed limits. The meters 12, 13, 14, and 15 are then driven in line with the results of this comparison, with meter 12 reading out the higher speed of wheel 4, meter 13 the range where both wheels 3 and 4 have fairly identical speeds, and meter 14 the higher speed of wheel 3. Meter 15 signals when the maximum permissible speed difference between the two wheels 3 and 4 has been exceeded.

A preferred embodiment of the analyser circuit 11 is detailed below.

Wheel 4 is preferably balanced at a speed $n_1$ superior to or greater than $n_2$, and in turn wheel 3 is balanced at a speed $n_2$ superior to or greater than $n_1$.

As already described above, wheel 4 is accelerated to a higher speed until meter 12 indicates that a sufficiently large speed difference has been reached with respect to wheel 3. Then measurement of the unbalance is taken with the data measured by the pick-up support 6 and the detected speed, from transducers 8 and 9, being fed to an electronic unit (not shown) as described in Great Britain Pat. No. 860847 and German Pat. No. 1108475, incorporated by reference herein, for determination of the unbalance with respect to magnitude and direction.

As soon as the speed difference is going to exceed a maximum, thus involving the risk of damage to the differential gear 2, meter 15 will give a reading.

When the unbalance reading of wheel 3 is to be taken, wheel 4 is slowed down by the friction wheel 10 so that wheel 3 runs at a higher speed under the effect of the differential gear 2. Wheel 3 having reached a higher speed relative to wheel 4, the meter 14 will give a relative reading. Balancing of wheel 3 is accomplished as described for wheel 4. In this case, meter 15 would give a reading if the speed difference exceeded a maximum permissible value. The range where the wheels 3 and 4 run at fairly identical speeds is indicated on meter 13. In this range the unbalance measurement of one wheel is likely to be adversely affected by the other wheel, and vice versa.

A preferred embodiment of the analyser circuit 11 is illustrated in FIG. 1 as an electronic block diagram. Comparison with preset limits may, of course, be accomplished with other comparable means as well.

The measured speeds $n_1$ and $n_2$ of the wheels 4 and 3 are fed to the adding circuit 16, which determines the value $$z = \frac{n_1 + n_2}{2}.$$

This value z is fed into the multipliers 17 and 18. The factors x and y which are multiplied with z are preset depending on the accuracy of the electronic unit. The more accurate the employed selective measuring technique, the smaller the difference between x and y. As an example, x can equal 1.2 and y can equal 0.8. These factors are selected so that due to hysteresis a required range is achieved. X and y can be changed, if necessary, if the difference between x and y is too small for the selective measuring technique. If x and y are changed, the new values of x and y must reflect required new rates of revolution for $n_1$ and $n_2$.

The output of the multiplier 17 is fed to comparator 19 to which also speed $n_1$ is entered. As soon as $n_1$ is superior to x . z, meter 12 will give a reading.

The outputs of the multipliers 17 and 18 are furthermore fed to a range-selective meter 20 so that meter 13 will give a reading as soon as $n_1$ is between x . z and y . z, i.e. when the speeds of both wheels 3 and 4 are fairly identical and therefore sufficient selectivity is not insured. This results when meter 13 indicates the difference in speeds between wheels 3 and 4 is insufficient for measuring. Therefore, one wheel must be braked more or sped faster.

The output of the multiplier 18 is also fed to a second comparator 21 which compares it with speed $n_1$. As soon as $n_1$ is inferior to y . z, meter 14 will give a reading.

In order to prevent the differential gear from damage, the measured speeds $n_1$ and $n_2$ are fed to a subtracting circuit 22. The absolute value $|n_1-n_2|$ is fed to a third comparator 24 which compares it with the maximum permissible speed difference preset on the speed limit adjuster 23. This limit being exceeded, a reading will be given on meter 15.

What is claimed is:

1. A method of determining the unbalance of two wheels mounted on a drive axle, said two wheels being operatively connected by a differential gear, said method comprising:
   rotating said two wheels within a predetermined speed of rotation range;
   changing the speed of rotation of one of said two wheels while said two wheels are being rotated within said predetermined speed of rotation range and thereby inversely changing the speed of rotation of the other of said two wheels in proportion to the change in speed of rotation of said one of said two wheels due to the connection of said two wheels by said differential gear;
   measuring the difference in speed of rotation between said two wheels;
   comparing said difference in speed of rotation with a predetermined difference in speed of rotation range; and
   measuring the unballance of each of said two wheels in turn when said two wheels are rotating within said predetermined difference in speed of rotation range.

2. The method of claim 1, further comprising the step of indicating when the difference in speed of rotation between said two wheels has exeeded a predetermined difference in speed limit.

3. The method of claim 1, further comprising the step of indicating when said two wheels are being rotated within said predetermined speed of rotation range.

4. The method of claim 1, further comprising the step of indicating when the speeds of rotation of said two wheels are within said predetermined difference in speed of rotation range.

5. A method of determining the unbalance of one of two wheels mounted on a drive axle, said two wheels being operatively connected by a differential gear, said method comprising:
   rotating said two wheels within a predetermined speed of rotation range;
   increasing the speed of rotation of one of said two wheels while said two wheels are being rotated within said predetermined speed of rotation range and thereby decreasing the speed of rotation of the other of said two wheels in proportion to the increase in speed of rotation of said one of said two wheels due to the connection of said two wheels by said differential gear;
   measuring the difference in speed of rotation between said two wheels;
   comparing said difference in speed of rotation with a predetermined difference in speed of rotation range; and
   measuring the unbalance of said one wheel when said two wheels are rotating within said predetermined difference in speed of rotation range.

6. The method of claim 5, further comprising the step of indicating when the difference in speed of rotation between said two wheels has exceeded a predetermined difference in speed limit.

7. The method of claim 5, further comprising the step of indicating when said two wheels are being rotated within said predetermined speed of rotation range.

8. The method of claim 5, further comprising the step of indicating when the speed of either of side two wheels has exceeded the speed of the other of said two wheels by said predetermined difference in speed of rotation range.

9. An apparatus for determining the unbalance of two wheels mounted on a drive axle, said two wheels being operatively connected by a differential gear so as to be rotated together within a predetermined speed of rotation range, said apparatus comprising:
   first measuring means for measuring the speed of rotation of each of said two wheels,
   speed means for changing the speed of rotation of one of said two wheels while said two wheels are being rotated by said driving means, a proportionately opposite change in the speed of rotation of the other of said two wheels resulting due to the connection of said two wheels by said differential gear,
   comparing means for indicating when a difference in speed of rotation of said two wheels, caused by said speed means and measured by said first measuring means, is within a predetermined difference in speed of rotation range, and second measuring means for measuring the unbalance of each of said two wheels in turn when said difference in speed of rotation is within said predetermined difference in speed of rotation range as indicated by said comparing means.

10. The apparatus of claim 9, further comprising indicating means for indicating when said two wheels are being rotated within said predetermined speed of rotation range.

11. The apparatus of claim 9, further comprising indicating means for indicating when the difference in speed of rotation of said two wheels has exceeded a predetermined speed limit.

12. An apparatus for determining the unbalance of two wheels mounted on a drive axle, said two wheels being operatively connected by a differential gear so at to be rotated together within a predetermined speed of rotation range, said apparatus comprising:

first measuring means for measuring the speed of rotation of each of said two wheels, speed means for accelerating the speed of rotation of one of said two wheels when said two wheels are being rotated by said driving means, a proportionate decrease in the speed of rotation of the other of said two wheels occuring due to the connection of said two wheels by said differential gear, comparing means for indicating a difference in speed or rotation of said two wheels, caused by said speed means and measured by said first measuring means, is within a predetermined difference in speed of rotation range, and second measuring means for measuring the unbalance of said one of said two wheels when said difference in speeds is within said predetermined difference in speed of rotation range as indicated by said comparing means.

13. The apparatus of claim 12, further comprising indicating means for indicating when said two wheels are being rotated within said predetermined speed of rotation range.

14. The apparatus of claim 12, further comprising indicating means for indicating when the difference in speed of rotation of said two wheels has exceeded a predetermined speed limit.

* * * * *